United States Patent
Doll et al.

Patent Number: 5,954,367
Date of Patent: Sep. 21, 1999

[54] FUEL TANK FOR VEHICLES, PARTICULARLY PASSENGER CARS

[75] Inventors: Dieter Doll, Magstadt; Ulrich Essig, Wendlingen, both of Germany

[73] Assignee: Dr. Ing. h.c.F. Porsche AG, Weissach, Germany

[21] Appl. No.: 08/705,124

[22] Filed: Aug. 29, 1996

[30] Foreign Application Priority Data

Sep. 7, 1995 [DE] Germany .............. 195 32 988

[51] Int. Cl.⁶ .................................................. B60P 3/22
[52] U.S. Cl. ................... 280/834; 137/354; 137/587; 137/592; 220/86.2
[58] Field of Search ................................... 280/830, 834; 220/86.2, 86.1, 905, DIG. 24, DIG. 33; 137/351, 354, 584, 587, 592; 296/195, 204

[56] References Cited

U.S. PATENT DOCUMENTS

| | | |
|---|---|---|
| 1,589,500 | 6/1926 | Wilcox . |
| 3,448,892 | 6/1969 | Thieman . |
| 4,394,925 | 7/1983 | Rump et al. ........................... 285/402 |
| 5,201,547 | 4/1993 | Ogawa et al. ......................... 280/834 |
| 5,373,957 | 12/1994 | Gryc ........................................ 220/86.1 |
| 5,474,048 | 12/1995 | Yamazaki et al. ..................... 220/86.2 |

FOREIGN PATENT DOCUMENTS

| | | |
|---|---|---|
| 0067 652A1 | 12/1982 | European Pat. Off. . |
| 3243833C1 | 5/1984 | Germany . |
| WO91/11342 | 8/1991 | WIPO . |

OTHER PUBLICATIONS

Search Report, Mar. 4, 1998, Europe.

*Primary Examiner*—Anne Marie Boehler
*Attorney, Agent, or Firm*—Evenson, McKeown, Edwards & Lenahan P.L.L.C.

[57] ABSTRACT

A fuel tank for vehicles, particularly passenger cars, has a filler neck which, in the area of a connection to the fuel tank, is guided around the upper edge of an adjoining body part or chassis part and penetrates a lateral fuel tank wall, a partial area of the filler neck projecting into the fuel tank interior. So that the maximal filling level of the fuel tank can be lowered under the plane A—A of the adjoining body part or chassis part, and therefore a sufficient expansion volume is ensured, it is provided that the end of the filler neck which projects into the tank interior and a filling ventilation extend below the level A—A defined by the upper edge of the body part or the chassis part, the maximal filling level H being determinable by the highest point of the filling ventilation situated in the tank interior.

15 Claims, 4 Drawing Sheets

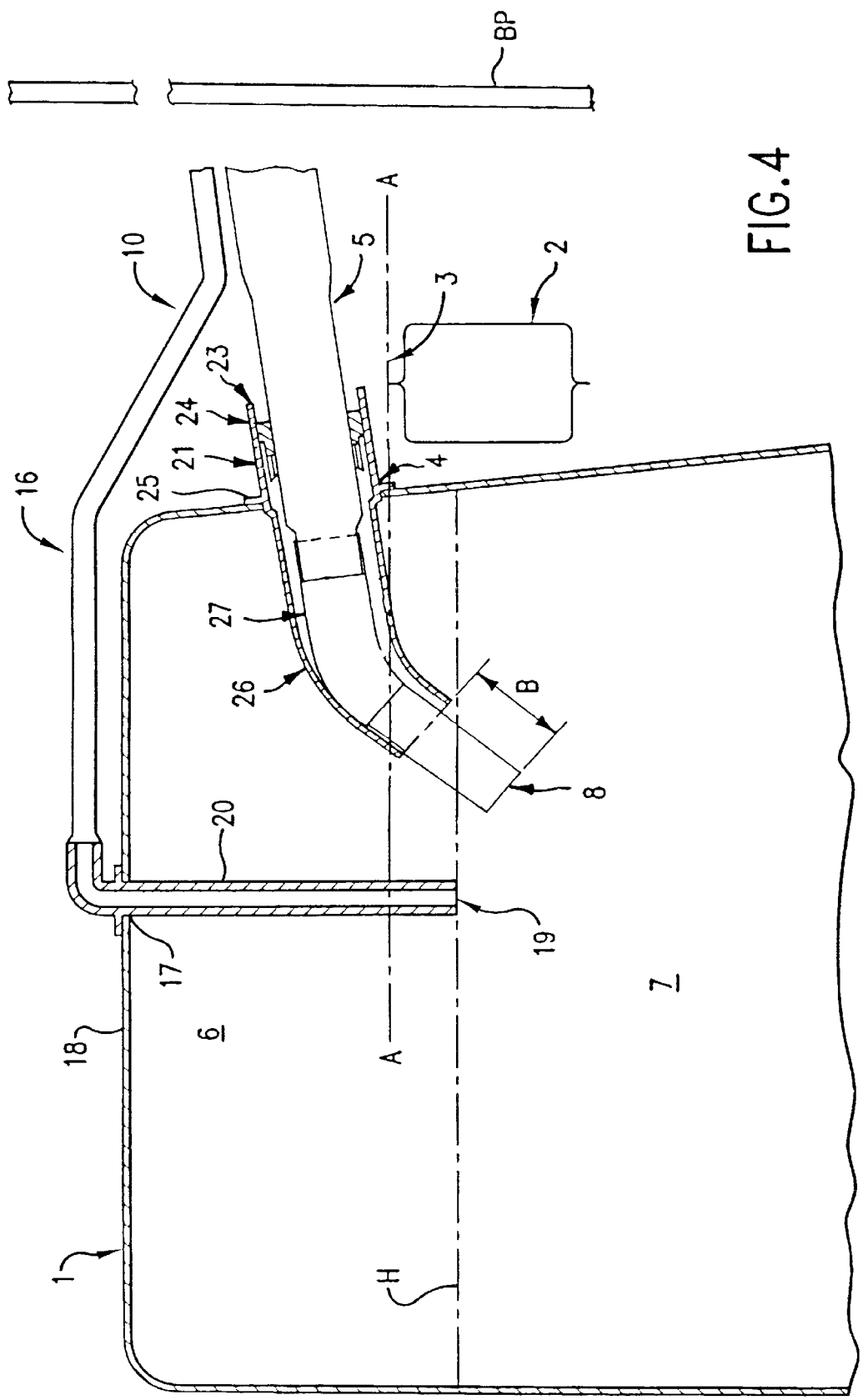

FUEL TANK FOR VEHICLES, PARTICULARLY PASSENGER CARS

BACKGROUND AND SUMMARY OF THE INVENTION

This invention relates to a fuel tank for vehicles, particularly passengers cars, of the type having a filler neck which, in the area of a connection to the fuel tank, is guided around the upper edge of a body part or chassis part adjoining the fuel tank and penetrates a lateral fuel tank wall, a partial area of the filler neck projecting into the fuel tank interior.

European Patent Document EP 0 067 652 A1 shows a fuel tank for vehicles, particularly passenger cars, having a filler neck which, in the area of its connection to the fuel tank, extends along the upper edge of an adjoining hollow support and penetrates a lateral fuel tank wall, a partial area of the filler neck projecting into the tank interior.

Caused by the height dimension of the adjoining body-side hollow support, the filler neck extending around the upper edge of the hollow support is connected to the fuel tank at a relatively high level.

The end of the tube-shaped filler neck, which projects only slightly into the tank interior, defines by means of the highest point at which displaced air can emerge, the maximal filling level H of the fuel tank. In the case of this arrangement, the maximal filling level H is situated relatively close to the upper fuel tank wall, specifically above the upper edge of the body-side hollow support so that only a relatively small expansion volume exists above the maximal filling level. However, in order to provide a perfect operation of the fuel tank and to avoid a flowing-out of fuel particularly at high temperatures and/or in an oblique position of the vehicle, an expansion volume is required which amounts to approximately 10% of the total tank interior.

It is an object of the invention to take such measures on a fuel tank arranged adjacent to a relatively high-level body part or chassis part and provided with a filler neck that the maximal filling level can be lowered below the upper edge of the adjoining body part or chassis part and therefore a sufficient expansion volume of the fuel tank is ensured.

According to the invention, this object is achieved by providing a fuel tank assembly of the above noted type wherein an end of the filler neck which projects into the tank interior and a filling ventilation extend below a plane defined by an upper edge of the adjoining body part or chassis part, the maximal filling level being determinable by the highest point of the filling ventilation situated in the tank interior, and wherein the free end of the filler neck extends no higher than at the level of the filling height or lower.

Principal advantages achieved by means of the invention are that, as the result of the extending down of a filling ventilation and of the free end of the filler neck projecting into the tank interior to below the level of the upper edge of the adjoining body part or chassis part, the maximal filling level can be lowered so that, also in the case of these unfavorable conditions, an expansion volume of approximately 10% of the container volume is ensured. The filler neck can be fixedly connected with the fuel tank.

Advantageously, the filler neck is constructed as a plug-type filler neck; that is, it is only subsequently plugged into the already mounted fuel tank. For this purpose, the fuel tank is provided with a receiving neck which is fixed on the exterior side of the fuel tank by way of a collar. The receiving neck comprises an exterior first section with a sealing element fastened to it which interacts with the guided-through filler neck.

The second section of the receiving neck, which projects relatively far into the tank interior, is extended diagonally downward by means of a curved section and is used as a guide for the interior filler neck. In the area of the receiving neck, the filler neck, at least in sections, has a flexible section which is formed by a corrugated pipe or by a rubber part. The flexible section can be formed by an end piece or an intermediate piece which is connected to a straight-line section of the filler neck. In the starting condition (delivery condition), the filler neck has a straight-line shape and assumes a curved shape only when it is plugged into the exterior receiving neck. Advantageously, an interior filling ventilation is provided for the filler neck, whereby the mounting is facilitated, the emission is decreased and the costs are reduced.

In the case of the interior filling ventilation, the ventilation pipe extends inside the filler neck and, in sections, also has a flexible section.

However, the lowering of the maximal filling level H of the fuel tank functions also in the case of an exterior filling ventilation. The highest point of the filling ventilation at which displaced air can flow out defines the maximal filling level of the fuel tank. The filler neck is guided so far downward that it reaches no higher than to this level or is situated lower.

The filler neck projects over the receiving neck in the direction of the tank interior. By providing different lengths for the filler neck and/or the filling ventilation, when the fuel tanks are identical, different maximal filling levels can be implemented (for example, small car—small tank content). By means of the extending-down of the filler neck and of the filling ventilation, all filling levels can be implemented at the level of the entry point of the filler neck and below it.

Other objects, advantages and novel features of the present invention will become apparent from the following detailed description of the invention when considered in conjunction with the accompanying drawings.

BRIEF DESCRIPTION OF THE DRAWINGS

FIG. 4 is another vertical sectional view corresponding to FIG. 3 showing a fourth embodiment of the present invention with an exterior filling ventilation.

DETAILED DESCRIPTION OF THE DRAWINGS

Figure 1:
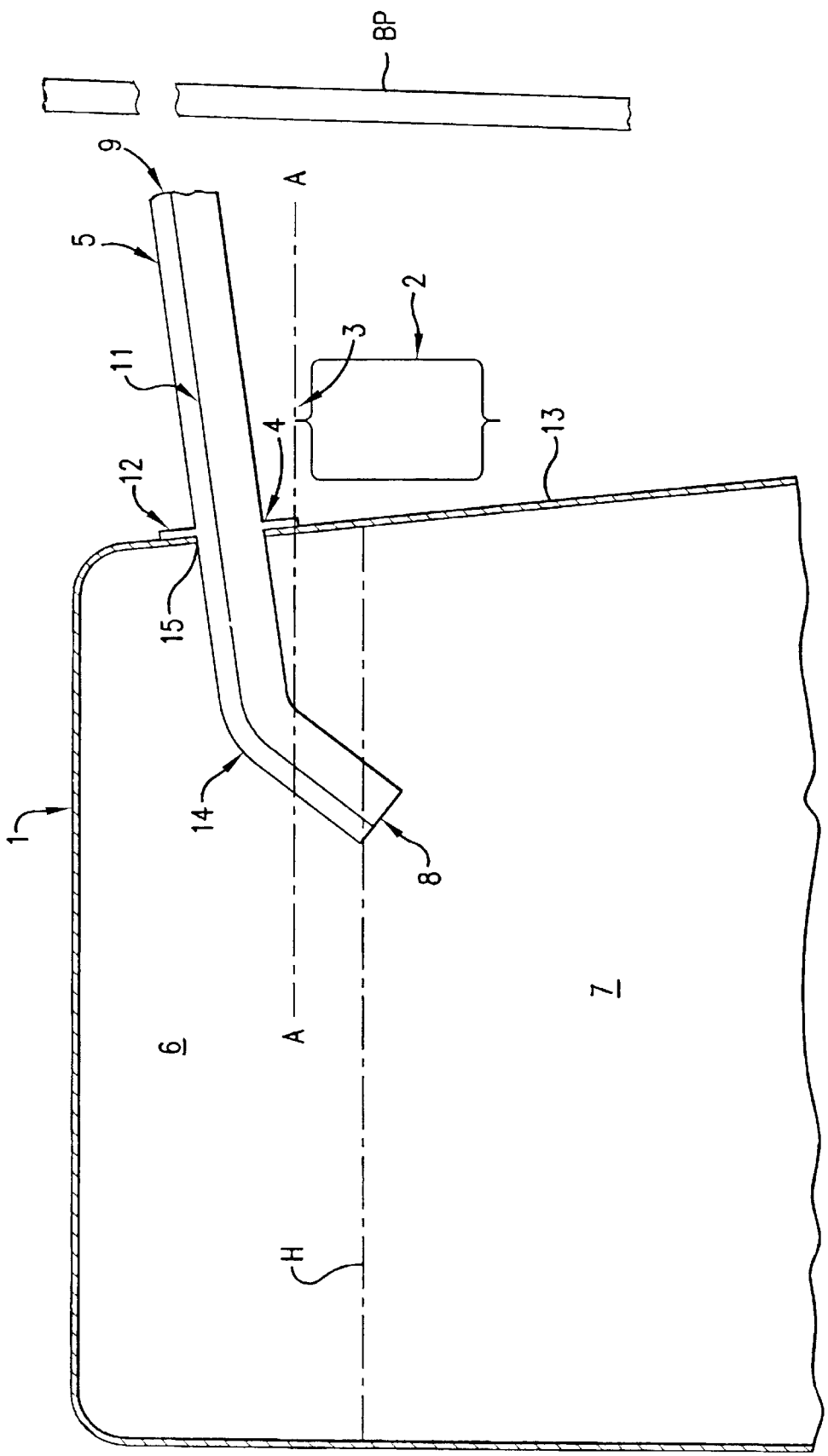
FIG. 1 is a vertical sectional view of a fuel tank having a filler neck, an interior filling ventilation and an adjoining body part or chassis part, constructed according to a preferred embodiment of the present invention.

FIGS. 1 to 4 each show an upper partial area of a fuel tank 1 for a vehicle, particularly a passenger car, which is constructed of a synthetic or sheet metal material and includes an exterior body panel BD schematically depicted in the drawing figures. In a manner not shown in detail, the fuel tank 1 is held in position on the body by means of conventional fastening elements. A body part or chassis part 2 whose upper edge 3 defines a horizontal plane A—A adjoins the fuel tank 1. In the embodiments shown, the body part or chassis part 2 is formed by a longitudinally directed hollow support. In FIGS. 1–4 like reference numerals are used to indicate similar structures.

Because of the height dimension of the hollow support, the entry point 4 of a filler neck 5 is situated relatively high on the fuel tank 1. In order to ensure, in the case of these unfavorable space conditions, a sufficient expansion volume 6 (approximately 10% of the volume of the whole tank interior 7) above the maximal filling level H, it is provided that the end 8 of the filler neck 5 projecting into the tank interior 7 and a filling ventilation 9, 10 extend below a plane A—A defined by the upper edge 3 of the adjoining body part or chassis part 2. The maximal filling level H is determined by the highest point of the free end of the filling ventilation 9, 10 situated in the tank interior 7. The free end 8 of the filler neck 5 extends no higher than at the level of the filling height H or lower.

By extending down the filling ventilation 9, 10 and of the free end 8 of the filler neck 5 within the fuel tank 1, the maximal filling level H can be lowered below the plane A—A. The highest point of the clear passage cross-section of the free end 8 of the filler neck 5 therefore extends no higher than at the level of the filling height H or lower.

FIG. 1 illustrates a fuel tank with a filler neck 5 fastened thereto and an interior filling ventilation 9; that is, a ventilation pipe 11 of the filling ventilation 9 extends within the filler neck 5, specifically in its upper area.

By means of a radial collar 12, the filler neck 5 is fastened on the exterior side of a lateral fuel tank wall 13 by means of welding, gluing or the like and, by means of a section 14, projects through an opening 15 of the fuel tank wall 13 into the tank interior 7.

The angular or curved section 14 points downward by means of its free end 8, specifically in the direction of the bottom of the fuel tank 1. In the embodiment shown, the section 14 is composed of two angularly fitted-together areas which are connected with one another by way of a curved transition area.

The free ends of the filling ventilation 9 and of the filler neck 5 are situated below the plane A—A, in which case the maximal filling level H is determined by the highest point from which the displaced air can escape through the ventilation pipe 11. In this case, the free end 8 of the filler neck 5 is situated slightly lower than the maximal filling level H.

Figure 2:
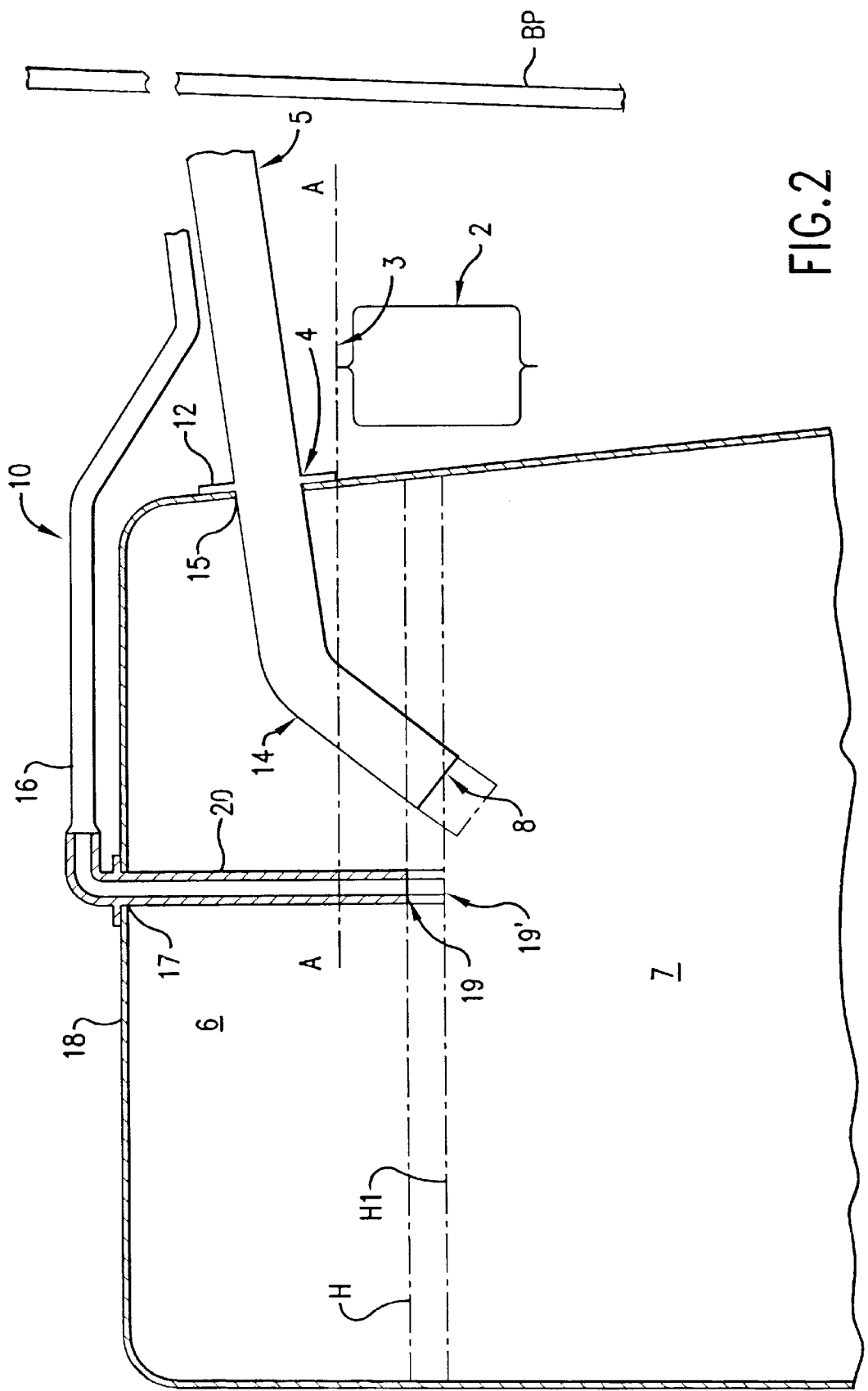
FIG. 2 is another vertical sectional view corresponding to FIG. 1 showing a second preferred embodiment of the present invention with an exterior filling ventilation.

FIG. 2 differs from FIG. 1 in that an exterior filling ventilation 10 is provided. In this case, a ventilation pipe 16 extends outside the filler neck 5 and is guided through an opening 17 of the upper fuel tank wall 18 into the tank interior 7. The lower, horizontally extending end 19 of the section 20 of the ventilation pipe 16 projecting into the tank interior defines the maximal filling level H which here also is situated below the plane A—A. The free end 8 of the filler neck 5 is situated slightly lower than the plane A—A.

Figure 3:
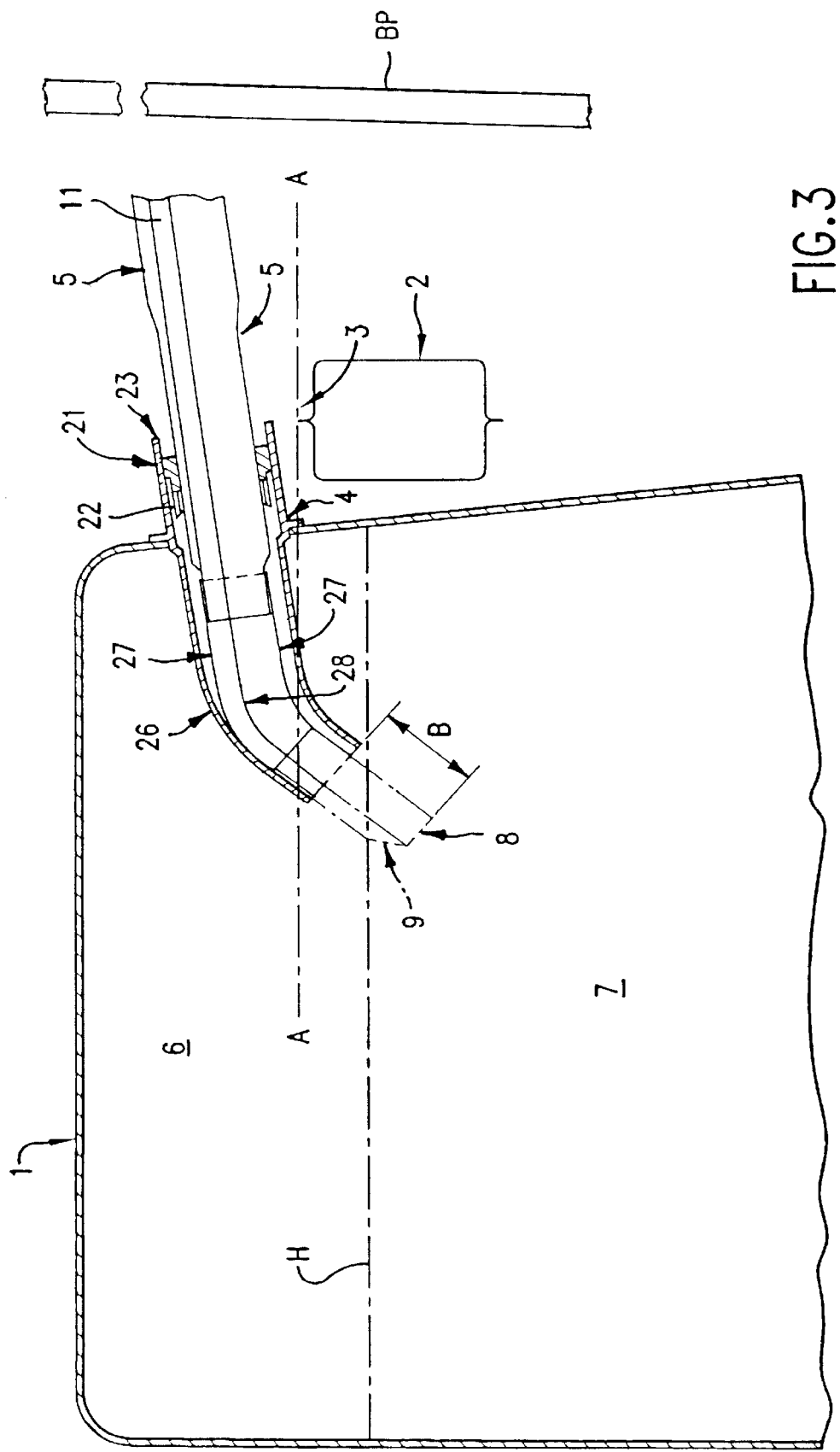
FIG. 3 is a vertical sectional view of a fuel tank having a plugged-in filler neck, an interior filling ventilation and an adjoining body part or chassis part, constructed according to a third embodiment of the present invention.

A particularly advantageous type of a further development according to the invention is illustrated in FIG. 3. Here, the filler neck 5 is constructed as a "plug-type filler neck"; that is, it is subsequently mounted on the vehicle in the case of an already installed fuel tank 1. This arrangement also has an interior filling ventilation 9.

When the filler neck is plugged in, a tube-shaped receiving neck 21 is arranged on the fuel tank 1 through which the filler neck 5 is guided in areas or sections. The filler neck 5 projects over the receiving neck 21 within the tank interior 7 by an extent B.

Between the filler neck 5 and the receiving neck 21, a sealing element 22 is provided which, according to the embodiment of FIG. 3, is held in position on the receiving neck 21. The sealing element 22 is fitted onto a corrugated receiving section of an interior cylindrical leg of a sleeve 23. An exterior leg of the sleeve 23 extends around the free end of the exterior receiving neck 21 and is connected with the receiving neck 21 by way of a jointed-flange connection 24.

The section of the receiving neck 21 situated outside the fuel tank 1 is supported by way of a radial collar 25 on the exterior side of the fuel tank 1 and is fastened there. Adjoining the collar 25, the receiving neck 21 has a second curved guide section 26 which extends within the fuel tank 1 and points downward.

In the area of the curved or angular guide section 26, the filler neck 5 is provided at least in sections with a flexible section 27. In the case of an interior filling ventilation 9, the ventilation pipe 11 extending inside the filler neck 5 also has a flexible section 28. The flexible sections 27, 28 of the filler neck 5 and the ventilation pipe 11 are each formed by a bendable corrugated pipe (for example, made of PA) or a by a bendable rubber part or plastic part.

According to FIG. 3, the flexible sections 27, 28 form intermediate pieces of the filler neck 5 and of the ventilation pipe 11. The intermediate pieces connect straight-line sections of the filler neck 5 or of the ventilation pipe 11 with straight-line, short end pieces of the filler neck 5 and of the ventilation pipe 11. However, it is also possible that the flexible sections 27, 28 form end areas of the filler neck 5 and of the ventilation pipe 11.

In the delivered condition, the filler neck 5 and the ventilation pipe 11 have a straight shape. Only when they are introduced into the fuel tank 1, the filler neck 5 and the ventilation pipe 11 are bent downward by means of the exterior guide section 26 of the receiving neck 21 and have a curved shape at least in sections.

The maximal filling level H, according to FIG. 3, is determined by the highest point of the interior filling ventilation 9 arranged inside the tank interior 7.

FIG. 4 is essentially identical with FIG. 3; only, instead of the interior filling ventilation 9, an exterior filling ventilation 10 according to FIG. 2 is provided.

By means of the different construction of the filling ventilation 9, 10 (length of the ventilation pipe) and of the filler neck 5, while the fuel tank 1 is the same, different maximal filling levels H can be implemented (for example, small car—small fuel tank).

By the lengthening of the section 20 of the ventilation pipe 10 in the downward direction and the lengthening of the filler neck 5, the filling level in FIG. 2 can be lowered from H to H1. The lengthenings are in each case illustrated by a dash-dotted line.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A passenger motor vehicle body assembly comprising:
    a body support member extending under an exterior body panel,
    a fuel tank disposed adjacent the body support member at its side opposite the exterior body panel,
    a filler neck extending from above the body support member through a lateral wall of the fuel tank and is plugged into a tube-shaped receiving neck of the fuel tank, said filler neck being curved downwardly in the fuel tank to a vertical level disposed below an upper side of the body support member and projects over the receiving neck by an extent, a sealing element being arranged between the receiving neck and the filler neck, said sealing element being held in position on the receiving neck, and a ventilation extending into the fuel tank, said ventilation determining a maximum filling level of the tank, wherein a free open end of the filler neck extends no higher than at the maximum filling level of the tank.

2. An assembly according to claim 1, wherein the highest point of the clear passage cross-section of the free end of the filler neck is arranged at the level of the filling height or lower.

3. An assembly according to claim 1, wherein the body support member is a hollow tubular support member.

4. An assembly according to claim 1, wherein said assembly is configured such that the maximum filling level of the fuel tank leaves approximately 10% of open space at the top of the fuel level in a filled fueled tank.

5. An assembly according to claim 1, wherein the sealing element is fitted by means of a corrugated receiving section onto an interior leg of a sleeve, and wherein an exterior leg of the sleeve is connected with the receiving neck by way of a jointed-flange connection.

6. An assembly according to claim 1, wherein a section of the receiving neck situated outside the fuel tank is fixed on the exterior side of the fuel tank by way of a radial collar, wherein the receiving neck has a second guide section which extends inside the fuel tank and points downward, and wherein at least the filler neck has a flexible section in an area of a curved or angular guide section.

7. An assembly according to claim 6, wherein the filler neck and a ventilation pipe of the filling ventilation arranged inside the filler neck have a respective flexible section.

8. An assembly according to claim 1, wherein selective different constructions of the filling ventilation and of the filler neck are provided for implementing different maximal filling levels of a given tank.

9. A passenger motor vehicle body assembly comprising:

a body support member extending under an exterior body panel, a fuel tank disposed adjacent the body support member at its side opposite the exterior body panel, a filler neck extending from above the body support member into the fuel tank to a vertical level disposed below an upper side of the body support member, and a ventilation extending into the fuel tank, said ventilation determining a maximum filling level of the tank, wherein a free open end of the filler neck extends no higher than at the maximum filling level of the tank, wherein the filler neck is plugged into a tube-shaped receiving neck of the fuel tank, a sealing element being arranged between the receiving neck and the filler neck, wherein the filler neck projects over the receiving neck by an extent, and wherein the sealing element is held in position on the receiving neck.

10. An assembly according to claim 9, wherein the sealing element is fitted by means of a corrugated receiving section onto an interior leg of a sleeve, and wherein an exterior leg of the sleeve is connected with the receiving neck by way of a jointed-flange connection.

11. A passenger motor vehicle body assembly comprising:

a body support member extending under an exterior body panel, a fuel tank disposed adjacent the body support member at its side opposite the exterior body panel, a filler neck extending from above the body support member into the fuel tank to a vertical level disposed below an upper side of the body support member, and a ventilation extending into the fuel tank, said ventilation determining a maximum filling level of the tank, wherein a free open end of the filler neck extends no higher than at the maximum filling level of the tank, wherein the filler neck is plugged into a tube-shaped receiving neck of the fuel tank, a sealing element being arranged between the receiving neck and the filler neck, wherein the filler neck projects over the receiving neck by an extent, wherein a section of the receiving neck situated outside the fuel tank is fixed on the exterior side of the fuel tank by way of a radial collar, wherein the receiving neck has a second guide section which extends inside the fuel tank and points downward, and at least the filler neck has a flexible section in an area of a curved or angular guide section.

12. An assembly according to claim 11, wherein the filler neck and a ventilation pipe of the filling ventilation arranged inside the filler neck have a respective flexible section.

13. An assembly according to claim 12, wherein the flexible sections of the filler neck and of the ventilation pipe are in each case formed by a bendable corrugated pipe or a bendable rubber part.

14. An assembly according to claim 13, wherein the flexible sections form end areas or intermediate pieces of the filler neck and/or of the ventilation pipe.

15. A passenger motor vehicle body assembly comprising:

a body support member extending under an exterior body panel, a fuel tank disposed adjacent the body support member at its side opposite the exterior body panel, a filler neck extending from above the body support member into the fuel tank to a vertical level disposed below an upper side of the body support member, and a ventilation extending into the fuel tank, said ventilation determining a maximum filling level of the tank, wherein a free open end of the filler neck extends no higher than at the maximum filling level of the tank, wherein the filler neck and the interior ventilation pipe, in the starting position, are aligned in a straight line, and wherein, when the filler neck is plugged into the receiving neck through a dimensionally stable guide section, the filler neck and the interior ventilation pipe will assume a curved shape.

* * * * *